Figure 1:
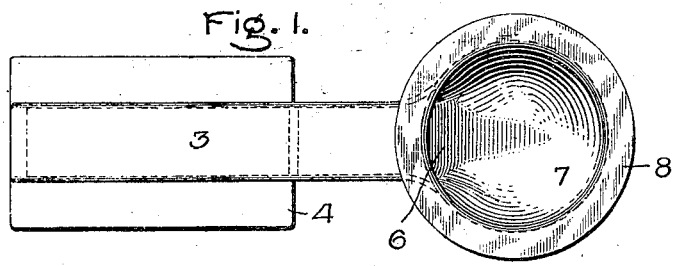

J. G. CALLAN.
NOZZLE FOR ELASTIC FLUID TURBINES.
APPLICATION FILED NOV. 21, 1904.

922,562. Patented May 25, 1909.

Witnesses:
Marcus L. Byng.
Alex. F. Macdonald.

Inventor,
John G. Callan,
By Albert G. Davis
Att'y.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

NOZZLE FOR ELASTIC-FLUID TURBINES.

No. 922,562.     Specification of Letters Patent.     Patented May 25, 1909.

Application filed November 21, 1904. Serial No. 233,571.

*To all whom it may concern:*

Be it known that I, JOHN G. CALLAN, a citizen of the United States, residing at Lynn, county of Essex, State of Massachusetts, have invented certain new and useful Improvements in Nozzles for Elastic-Fluid Turbines, of which the following is a specification.

The present invention has for its object to improve the construction of nozzles for elastic-fluid turbines.

In carrying out my invention, a core is provided upon which the metal forming the nozzle is deposited electrolytically, the core being melted out after the nozzle is formed. By this method no difficulty is experienced in forming the nozzles, no matter what their shape may be. In this connection it should be noted that each nozzle is commonly provided with an enlarged and well rounded bowl which merges into the throat of the discharge passage. From the throat to the discharge end the area of the passage usually increases, although it may be straight. In either event the portions of the core forming the bowl and passage are commonly so disposed that the core cannot be removed intact. I have found that wax or paraffin cores are suitable for this purpose. These may be formed in a mold of metal, as for example, Babbitt, the latter being finished carefully to the exact dimensions. The core can be made of any suitable material, preferably one which will cool with little or no shrinkage. It should accurately fill the mold and be fairly stiff when cold. I have found that a composition composed of paraffin, carnauba and ceresin is satisfactory for the purpose. Paraffin is used largely because it is cheap, carnauba on account of its hardening properties, and ceresin because it is tough. The proportions of these materials can be varied to suit the requirements. Fusible resinous materials, as sealing wax, or fusible metals are also suitable. I do not wish to be understood however as limiting myself to these or any other specific compositions for the cores. The essential feature is to provide a core that can be accurately and easily formed and which can be melted out of the nozzle after the latter is formed. To state the matter in other words, each nozzle is formed on a core which has a lower melting point than the material of which the nozzle is composed.

Instead of molding the cores, they may be cut by hand or otherwise out of a suitable material or composition.

If the core is of non-conducting material, after it is finished it is given a coat of conducting material, the latter being necessary in the process of electrolytic deposition. This conducting covering may be of any suitable nature. I have found powdered graphite to be satisfactory, and it also insures a perfectly smooth surface upon which to make the deposition. I may employ a metallic coating deposited from some salt in solution, such, for example, as nitrate of silver. The next step is to immerse the core in an electrolytic bath and deposit thereon a shell or covering of suitable thickness. Preferably the current density of the bath is low so that the deposited metal will be very hard. It is desirable, although not absolutely necessary, to remove the core or cores every few hours and rub it or them down with emery cloth or the like. This operation is repeated until the metal forming the nozzle is of the required thickness.

Bronze or composition can be employed for the nozzles. The nozzle can be formed individually or a number can be suitably supported and all deposited at once.

It is desirable to provide each nozzle at the time it is made with one or more suitable devices by means of which it can be secured to a support, such as a nozzle plate. Where the support is capable of sustaining the nozzles in proper alinement without these devices, they may be omitted.

In the accompanying drawing is shown a turbine nozzle made in accordance with my invention.

Figure 2:
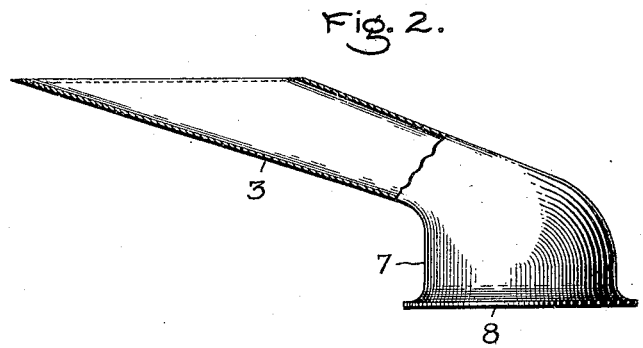
Figure 3:
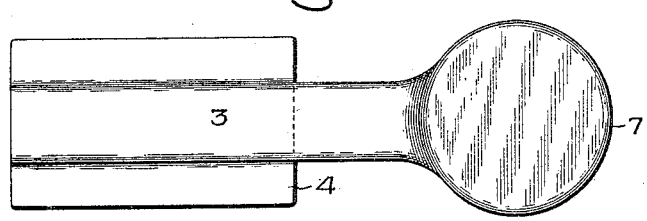
Figure 4:
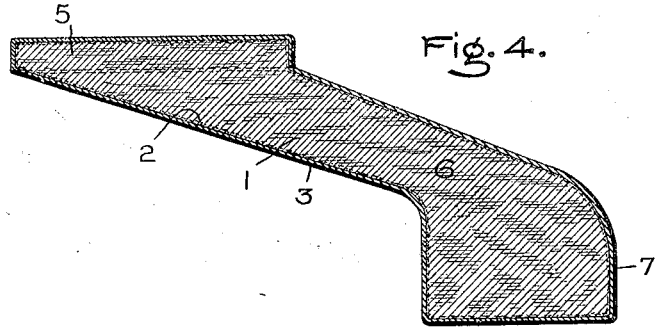

Figure 1 is a view looking into the bowl of a finished nozzle; Fig. 2 is a view in side elevation of the same with a portion of the nozzle broken away; Fig. 3 is a view showing the nozzle as it is removed from the electrolytic bath; and Fig. 4 is a longitudinal sectional view of the same.

1 represents the wax-like core of non-conducting material, and 2 the coating of conductive material which is applied thereto; 3 is the nozzle which is deposited electrolytically on the conducting material 2.

4 represents a flange by means of which the nozzle can be attached to a nozzle plate or other support.

In forming the core it is preferably provided with an extension 5 which serves to compensate for shrinkage.

6 represents the throat of the nozzle, and from this point to the discharge end the cross-sectional area gradually increases. The throat communicates directly with the bowl 7. After the metal has been deposited to the desired thickness on the core, it is cut away at the bowl or the discharge end after which the nozzle is subjected to heat to melt out the core. After the core is removed the flange 4 is finished to any desired shape, as is also the flange 8 on the bowl. These flanges are adapted to engage with suitable projections or walls on the nozzle-supporting plate.

When nozzles are cast,—the most convenient method of forming them,—a large amount of time is required to finish the surfaces presented to the steam or elastic-fluid, and upon the accuracy of these surfaces depends in a very great measure the efficiency of the turbine. Moreover only workmen of a high grade are competent to do this work. The area of the throat must bear a definite ratio with respect to that of the discharge end and when the former is round, as usual, and the latter rectangular, as usual, the difficulties in finishing are very great. At present the nozzle surfaces are first chipped with a cold chisel, then filed to gage, scraped, and later polished. Owing to the relation of the bowl to the throat, the surface of one must merge into the surface of the other in an unbroken curve, since otherwise objectionable eddies will be produced, resulting in a marked decrease in efficiency.

In a certain type of nozzle of large size which came to my attention, and having twelve passages, it required the time of two workmen for four weeks to chip, file, scrape, gage and polish them. Obviously if one nozzle passage is inadvertently made too large, or a chisel cuts too deep in one section, the nozzle is ruined. Since this error may be made in the last section to be finished, it follows that the entire time of the workmen is lost. Another thing which renders the work difficult is the fact that the nozzles are so heavy that they cannot be readily moved, also that the axes of the bowl and discharge passage do not coincide. It is customary to mount them on a fixed support and to work with an incandescent lamp so placed that the light will shine through the passage.

By means of my improved method of manufacturing, a superior nozzle is produced in which the above-mentioned difficulties are overcome. The nozzle passage can be given any desired shape or form, and the relation between the throat and discharge end made anything that is desired. The curved surfaces between the bowl and the throat can be made to conform to the theoretical requirements without difficulty, and when finished the working surfaces of the nozzle will be as smooth and regular as desired. Practically speaking, I am able to do away with all of the finishing which is now so expensive and tedious. Again, all of the nozzles will be alike in form and angle of delivery, and the chance for error is reduced to a point where it can be disregarded. If an accident happens to one nozzle section, due to any cause, the loss is trifling, and it can readily be replaced.

What I claim as new and desire to secure by Letters Patent of the United States, is,—

1. As an article of manufacture, a nozzle for an elastic fluid turbine which is formed of electro-deposited metal.

2. As an article of manufacture, a nozzle for an elastic fluid turbine which is formed of electro-deposited metal, said nozzle comprising integral bowl and discharge portions having flanged edges for securing the nozzle in position.

In witness whereof I have hereunto set my hand this 17th day of November, 1904.

JOHN G. CALLAN.

Witnesses:
   JOHN A. McMANUS, Jr.,
   DUGALD McK. McKILLOP.